(12) United States Patent
Thirunavukkarasu et al.

(10) Patent No.: US 11,854,023 B2
(45) Date of Patent: Dec. 26, 2023

(54) SYSTEM AND METHOD FOR SALES VOLUME DECOMPOSITION

(71) Applicant: Tata Consultancy Services Limited, Mumbai (IN)

(72) Inventors: Jeisobers Thirunavukkarasu, Chennai (IN); Shilpa Yadukumar Rao, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 5 days.

(21) Appl. No.: 17/336,366

(22) Filed: Jun. 2, 2021

(65) Prior Publication Data

US 2022/0122101 A1 Apr. 21, 2022

(30) Foreign Application Priority Data

Oct. 16, 2020 (IN) .............................. 202021045224

(51) Int. Cl.
*G06Q 30/0202* (2023.01)
*G06N 20/00* (2019.01)

(52) U.S. Cl.
CPC ......... *G06Q 30/0202* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2005/0273376 A1* | 12/2005 | Ouimet .................. | G06Q 10/04 705/7.29 |
| 2007/0282668 A1 | 12/2007 | Cereghini et al. | |
| 2010/0114625 A1* | 5/2010 | Beyer .................... | G06Q 30/02 705/7.11 |
| 2010/0114657 A1* | 5/2010 | Whipkey ............... | G06Q 10/04 705/7.11 |

(Continued)

OTHER PUBLICATIONS

Sajja et al., Explainable AI based Interventions for Pre-season Decision Making in Fashion Retail, CoRR, vol. abs/2008.07376; 2020, https://arxiv.org/abs/2008.07376 (Year: 2020).*

(Continued)

*Primary Examiner* — Chesiree A Walton
(74) *Attorney, Agent, or Firm* — Finnegan, Henderson, Farabow, Garrett & Dunner LLP

(57) ABSTRACT

Most current systems decompose sales volume of a product into base volume and additional volumes associated to each sales driver. Here base volume refers to sales quantity that is derived from non-promoted sales period. It leads base volume of a product with partial price effect. In addition, base volume includes volume contributed by store location, space allocated to product category and assortment etc. In the present disclosure a system and method for sales decomposition is described by computing reference base volume and sales contribution by each sales driver. Here reference base volume is the volume derived by excluding the effect of sales drivers namely, retailer price, competitor price, demographics, weather conditions, space occupied by the category to which the product belongs, number of available substitute products in assortment. Retail strategies are recommended in real time based on sales contribution of the sales driver for the product.

5 Claims, 5 Drawing Sheets

(56) References Cited

U.S. PATENT DOCUMENTS

| | | | |
|---|---|---|---|
| 2011/0261049 A1* | 10/2011 | Cardno | G06Q 40/04 345/419 |
| 2012/0303411 A1 | 11/2012 | Chen et al. | |
| 2019/0108538 A1 | 4/2019 | Montero et al. | |
| 2019/0188536 A1* | 6/2019 | Lei | G06K 9/6269 |

OTHER PUBLICATIONS

Chen et al., "Optimal Policies for the Pricing and Replenishment of Fashion Apparel considering the Effect of Fashion Level," Complexity/2019/Article (2019).

* cited by examiner

US 11,854,023 B2

SYSTEM AND METHOD FOR SALES VOLUME DECOMPOSITION

CROSS-REFERENCE TO RELATED APPLICATIONS AND PRIORITY

This U.S. patent application claims priority under 35 U.S.C. § 119 to Indian application No. 202021045224, filed on Oct. 16, 2020. The entire content of the abovementioned application is incorporated herein by reference.

TECHNICAL FIELD

The disclosure herein generally relates to a field of sales data processing and, more particularly, a system and method for sales volume decomposition of a product with high fluctuations in sales drivers.

BACKGROUND

Retailers want complete visibility on sales of every product in terms of how each sales driver contribute and how it could be measured in quantity. This will enable the retailers to locate the focus area to improve gross sales. Sales drivers are factors that impact sales of a product for a period of time. Few examples for sales driver are retailer price of a product, competitor price of a product, store location, space allocated for the category to which the product belongs, number of available substitute products in assortment and weather. Retailer price of a product, competitor price of a product, number of available substitute products in assortment and weather are few sales drivers with high fluctuations. Sales volume of a product is defined as the quantity or number of units sold by a retailer in a particular period of time. Sales volume decomposition analysis allows the retailer to explain the reason for sales volume change for a product by allocating the total change in volume to changes in key business sales drivers.

Most current systems decompose sales volume of a product into base volume (e.g., no promotions, no advertising, etc.) and additional volumes associated to each activity. The activities are activities of the business (e.g., a price increase for the product), other businesses in the market (e.g., a competitor's price for the product.) and the environment (e.g., a cold weather, etc.). As per current systems, a base volume represents the sales volume of a product if the business did not do any of the activities for the product, location, and time period. Ideally base volume is the volume generated without sales driver effect. As per current systems, base volume refers to sales quantity that is derived from non-promoted sales period. However, non-promoted sales period includes those days in which price changes occurs for the product and no promotion is followed. These price changes have high magnitude with short term in nature and they occur due to production, supply and transport constrains. In other words, as per current systems, base volume includes price effect partially and it makes additional volume associated to price as underestimated. In real scenarios, many perishable products such as vegetables and fruits have higher price variations in short terms. In addition, as per current system, base volume includes volume contributed by store location, space allocated to category and number of available substitute products in assortment as they do not have option to derive and separate the volumes associated with those sales drivers from base volume.

SUMMARY

Embodiments of the present disclosure provides technological improvements as solutions to one or more of the abovementioned technical problems recognized by the inventors in conventional systems.

A processor-implemented method for sales volume decomposition of a product with high fluctuations in sales drivers is described. The method comprises one or more steps as receiving a first set of transaction level historical sales volume information of a product, customer information, and one or more predefined sale drivers of the product from one or more predefined sources. The received first set of transaction level historical sales volume information of the product, customer information, and one or more predefined sale drivers is integrated and processed the integrated historical information to get one or more metrices and sales driver components, wherein one or more metrices include probability distributional parameters of quantity at store customer level and at corporate level.

Further, the method comprises computing a reference value for one or more predefined sales driver in actual form and in derived component form of the product at store level and corporate level based on the one or more metrices of the integrated information, estimating reference base volume of the product based on the computed reference values of the predefined sales drivers using a trained machine learning model, and determining sales volume contribution of the predefined sales driver in actual form and component form for the product from the difference between reference volume of the sales driver and reference base volume. Finally, the method derives sales volume contribution of the predefined individual variable of a sales driver in component form for the product based on the estimated sales volume contribution due to the sales driver component and network relationship existing among the variables within the component and recommends one or more retail strategies in real time using sales volume contribution of the predefined sales driver for the product.

In another aspect, a system for sales volume decomposition of a product with high fluctuations sales drivers is provided. The system comprising an input/output interface, at least one memory storing a plurality of instructions and one or more hardware processors communicatively coupled with at least one memory. The one or more hardware processors are configured to execute one or more modules.

The input/output interface of the system is configured to collect a first set of transaction level historical sales volume information of a product, customer information, and one or more predefined sale drivers of the product from one or more predefined sources. A data integration module is configured to integrate the collected one or more sets of information of the product, wherein the collected information is integrated at an individual transaction level. A data processing module of the system is configured to process the integrated historical information to generate one or more metrices of the integrated information and sales driver components, wherein one or more matrices include probability distributional parameters of quantity at store customer level and at corporate level. A data analysis module of the system is configured to compute a reference value for one or more predefined sales driver in actual form and in derived component form of the product at store level and corporate level based on the one or more matrices of the integrated information. A volume estimation module of the system is configured to estimate reference base volume of the product based on the computed reference values of the predefined sales drivers using a trained machine learning model. A contribution determination module of the system is configured to determine sales volume contribution of the predefined sales driver in actual form and component form for the product from the difference between reference volume of the sales driver and reference base volume. A recommendation module of the system is configured to recommend one or more retail strategies in real time using sales volume contribution of the predefined sales driver for the product.

In yet another aspect, a non-transitory computer readable medium for sales volume decomposition of a product with high fluctuations in sales drivers is provided. The non-transitory computer readable medium comprises one or more steps as receiving a first set of transaction level historical sales volume information of a product, customer information, and one or more predefined sale drivers of the product from one or more predefined sources. The received first set of transaction level historical sales volume information of the product, customer information, and one or more predefined sale drivers is integrated and processed the integrated historical information to get one or more metrices and sales driver components, wherein one or more metrices include probability distributional parameters of quantity at store customer level and at corporate level.

Further, the non-transitory computer readable medium includes computing a reference value for one or more predefined sales driver in actual form and in derived component form of the product at store level and corporate level based on the one or more metrices of the integrated information, estimating reference base volume of the product based on the computed reference values of the predefined sales drivers using a trained machine learning model, and determining sales volume contribution of the predefined sales driver in actual form and component form for the product from the difference between reference volume of the sales driver and reference base volume. Finally, the method derives sales volume contribution of the predefined individual variable of a sales driver in component form for the product based on the estimated sales volume contribution due to the sales driver component and network relationship existing among the variables within the component and recommends one or more retail strategies in real time using sales volume contribution of the predefined sales driver for the product.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
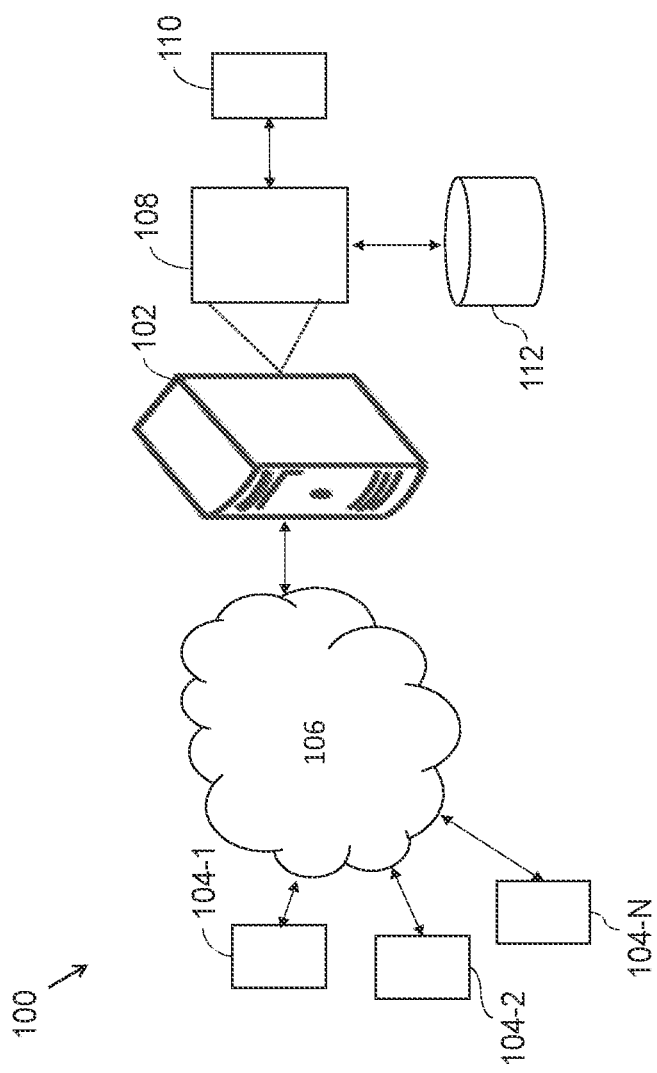
FIG. 1 is a network diagram of an exemplary system for sales volume decomposition of a product with high fluctuations in sales drivers, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and a system for sales volume decomposition of a product with high fluctuations in sales drivers such as vegetables and fruits. The disclosure proposes reference base volume and reference price and volume associated with reference sales drivers. The method includes deriving reference price for a product, reference sales drivers associated with that product. By using these derived measures reference base volume and reference volume are estimated for each of sales drivers and finally sales volume contribution by each sales driver is estimated.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates a network diagram of an exemplary system (100) for sales volume decomposition of a product with high fluctuations in sales drivers, in accordance with some embodiments of the present disclosure. Although the present disclosure is explained considering that the system (100) is implemented on a server, it may be understood that the system (100) may comprise of one or more computing devices (102), such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. The components and functionalities of the system (100) are described further in detail.

Figure 2:
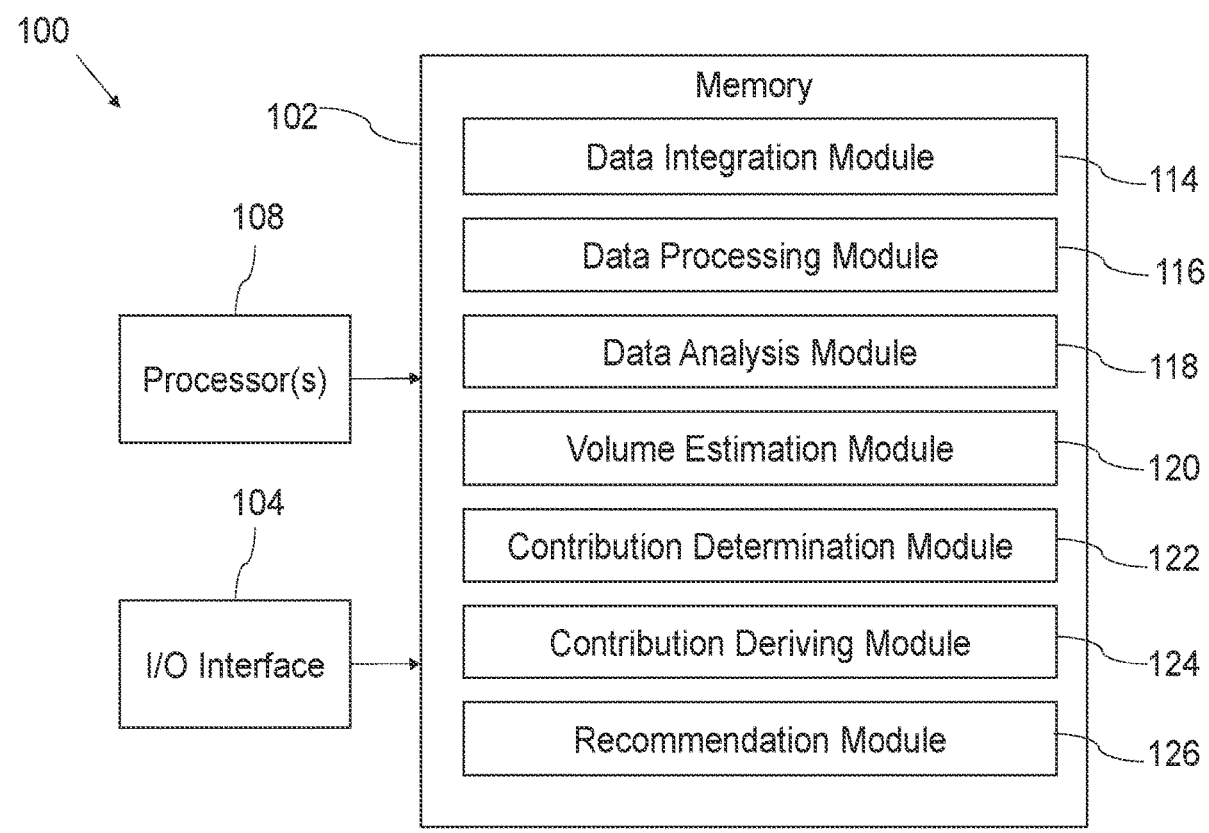
FIG. 2 illustrates a block diagram of the system for sales volume decomposition of a product with high fluctuations in sales drivers, in accordance with some embodiments of the present disclosure.

FIG. 2 illustrates a functional block diagram (200) of the system (100) for sales volume decomposition of a product with high fluctuations in sales drivers. In the preferred embodiment, the system (100) comprises of one or more processors (108), a database (112) and other modules (110). The other modules (110) includes a data integration module (114), a data processing module (116), a data analysis module (118), volume estimation module (120), contribution determination module (122), contribution deriving module (124) and a recommendation module (126).

In the preferred embodiment of the disclosure, the input/output interface (104) of the system (100) collects a first set of transaction level historical sales volume information of a product, customer information, and one or more predefined sale drivers of the product from one or more predefined sources. It would be appreciated that the reference sales drivers include reference price, reference demographic component, reference competitor price, reference weather, reference space, reference assortment, etc. Herein, the reference price is the price consumers have in mind and to which they compare the shelf price of a specific product. The reference price is a price point in which customer is ready to buy in quantity what they intended to buy, and it reflects the intended buying behavior of each customer. Here 'intended buying behavior' indicates that price does not influence the mind of customers to increase or decrease the quantity of intended product.

In the preferred embodiment of the disclosure, the reference demographic component is the sub-segment of demographics covering the store trade area and it captures intended buying behavior of a population. Reference competitor price is the price of competitor product at which customer is not switching to the competitor product and sticking to the retailer product. Reference temperature is the point of temperature at which it does not influence the mind of customers to increase or decrease the quantity of intended product. The same logic applies to other weather parameters such as precipitation, wind speed etc. and sales driver related with merchandising such as space occupied by the category to which the product belongs, number of available substitute products in assortment at the time of sale, etc.

In the preferred embodiment of the disclosure, the data integration module (114) of the system (100) is configured to integrate the received first set of transaction level historical sales volume information of the product, customer information, and one or more predefined sale drivers. Software framework for distributed storage is applied to store and process large volume of transactional data In addition, it is ensured that the data processing and computing occurs in RAM so that the data processing and computing of different level of transaction such as customer level and corporate level completed in real time.

In the preferred embodiment of the disclosure, the data processing module (116) of the system (100) is configured to process the integrated historical information to generate one or more metrices of the integrated information and sales driver components, wherein one or more metrices include probability distributional parameters of quantity at store customer level and at corporate level. For example, point of sale (POS) data of recent four months is used to get quantity distribution and the period may vary depends on the category and it needs to capture short term price variations. It is carried out at store customer level and at corporate level using a programming language with the processed data that comes from hadoop framework.

In one example, wherein demographic variables are available at individual store level and they are many and it may count as much as 200. Herein, each demographic variable capture information about the population of store trade area, and they have interrelationships between them. The demographic variables are processed into correlation matrix and applied with principal component analysis to condense the information without losing the significant network relationship and few numbers of components are derived. Each component has condensed information about the demographics in a network fashion. Each store has component scores that represents the demographic variables in condensed format.

In the preferred embodiment of the disclosure, the data analysis module (112) of the system (100) is configured to compute a reference value for one or more predefined sales driver in actual form or in derived component form of the product at store level and corporate level based on the one or more metrices of the integrated information.

In an instance, fitting a probability distribution of quantity with the maximum likelihood method is carried out at store customer level using a programming language with the processed data that comes from hadoop framework. The point of sale (POS) data of recent four months is used to get quantity distribution. Those quantities having higher probability are selected depending on the distribution followed by quantity. In an instance assuming that the quantity follows normal distribution, those quantities which comes under mean plus or minus one standard deviation of the distribution are selected. In other words, roughly 68% of quantities having higher probability of occurrence are selected from the transactions of a customer of a store.

Further, the reference price is derived by averaging those prices corresponding to the selected quantities using transaction details and it is the reference price for a customer for a product in a store. The same procedure is repeated for all customers of a store and distribution of customer reference prices is established. The mean of the distribution is considered as the reference price for a product for a store. Similarly, the reference competitor price is derived by averaging those competitor prices corresponding to the selected quantities by mapping the time stamp of transactions with corresponding competitor prices for the product for the same time stamp and it is reference competitor price for a customer for a product in a store. The same procedure is repeated for all customers of a store and distribution of customer competitor reference prices is established. The mean of the established distribution is considered as the reference competitor price for a product for a store.

To derive reference demographic component score and reference weather parameters, similar approaches are followed with the modification such that it is done at corporate level. Fitting a probability distribution of quantity with the maximum likelihood method is carried out at corporate level using a programming language. Those quantities having higher probability are selected depending on the distribution followed by quantity for next level processing. In another instance assuming that the quantity follows normal distribution at corporate level, those quantities which comes under mean plus or minus one standard deviation of the distribution are selected. In other words, roughly 68% of quantities having higher probability of occurrence at corporate level are selected.

The selected quantities and corresponding transactions are used to derive reference sales drives namely reference demographic component score and reference weather parameters. The selected quantities and corresponding transaction have store information. Each store has store demographic component score and store weather conditions. The reference demographic component score is derived by averaging those demographic component score corresponding to the selected quantities by mapping corresponding time stamp of transactions with store locations and it is the reference demographic component score for a product.

It would be appreciated that the reference temperature is derived by averaging those temperatures corresponding to the selected quantities by mapping the time stamp of transactions with temperature of corresponding stores and it is the reference temperature for a product. The same procedure is repeated for other weather parameters such as wind speed, precipitation, etc. It is apparent that the reference values of sales drivers are derived from the real time feed that comes from spark. The spark, a framework that has the capability of stream processing is used to process near real time information such as last one-hour retailer price, competitor price, weather conditions, etc. Herein, the data processing occurs in real time by ensuring that processing, aggregation, and computing happens in RAM. In addition, the processing framework is able to consider last minute change in sales driver such as competitor price changes, temperature changes, etc.

In the preferred embodiment of the disclosure, the volume estimation module (114) of the system (100) is configured to estimate reference base volume of the product based on the computed reference values of the predefined sales drivers using a trained machine learning model. Herein, the past historical sales volume data is mapped with sales drivers namely product price, competitor price, demographic components, weather, space occupied by the category to which the product belongs, number of available substitute products in assortment at the time of sale. Sales volume in quantity at hourly interval is considered as dependent variable and sales drivers at hourly interval is considered as independent variables. The time interval varies depending on product velocity and it is trained using machine learning model namely random forest at corporate level. Training at corporate level ensures to capture sales volume variations that arise across stores due to retailer price, competitor price, location, weather, space, and assortment. Programming language (In an instance, Python) is applied to develop and train random forest model using the processed data that comes from hadoop framework. Training happens at week level to capture sales behavior for the period starting from last few months to last one week. Prediction function of programming language, in an instance python is applied to predict sales volume in quantity using the pre trained model with the derived inputs such as reference price, etc. as well as the latest feed which comes from spark such as competitor price for last one hour, actual weather during last one hour, etc.

Figure 3:
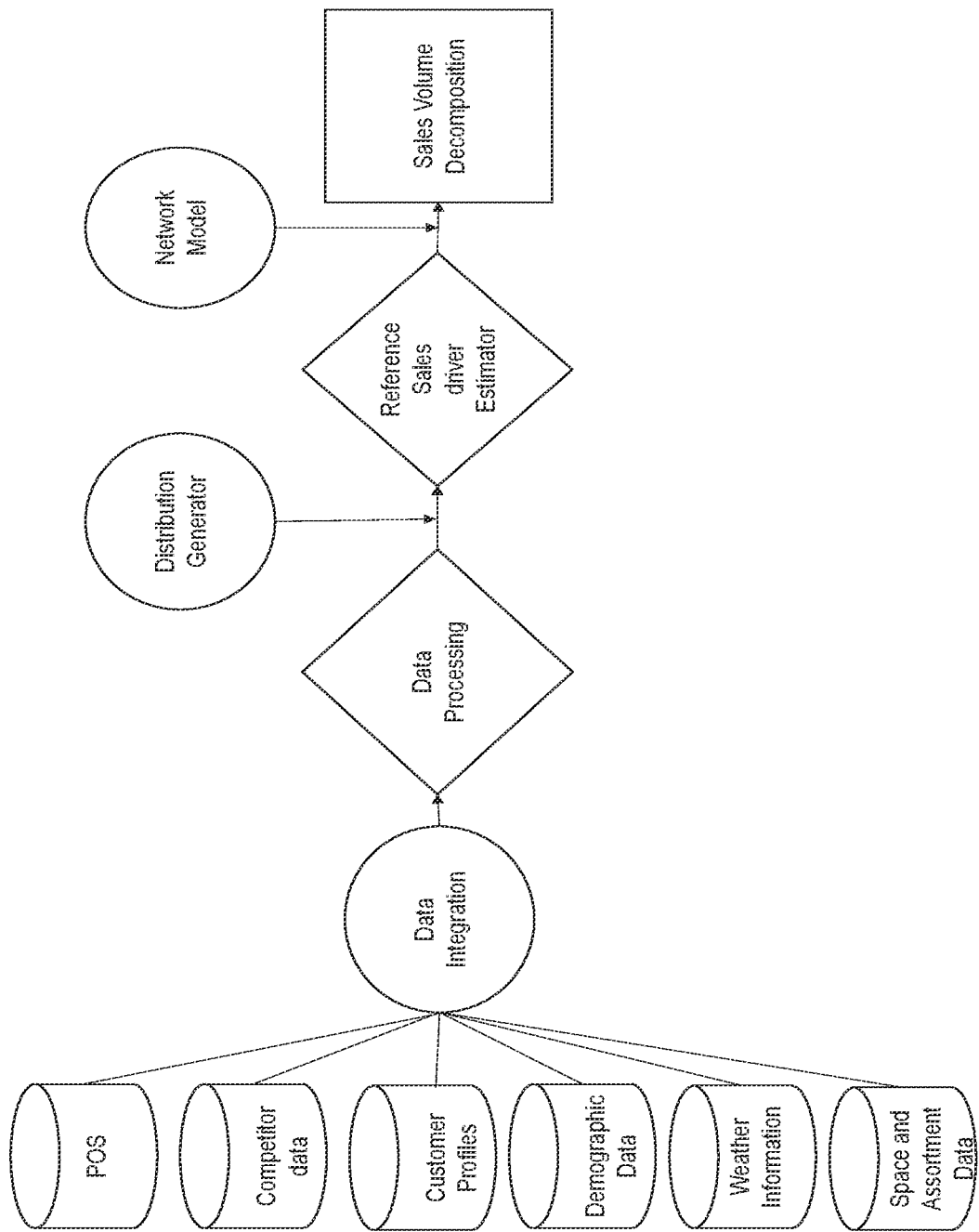
FIG. 3 is a functional block diagram for sales volume decomposition of a product, in accordance with some embodiments of the present disclosure.

Referring FIG. 3, a functional block diagram (300) illustrating the reference sales drivers namely reference price, reference competitor price, reference demographic component score and reference weather parameters are applied into trained machine learning model and prediction function of programming language is used to predict sales volume in quantity. The expected sales volume quantity for derived reference price and reference sales drivers is noted as reference base volume. It is the volume derived by values of sales drivers in which the sales drivers do not influence the mind of customers to increase or decrease the quantity of intended product. In other words, it has no influence of retailer price, competitor price, demographics, weather conditions, space occupied by the category to which the product belongs, number of available substitute products in assortment at the time of sale.

In the preferred embodiment, the reference volume estimation for a sales driver for a particular hour/day is derived using trained model by changing the sales driver with actual value of the hour/day and keeping other sales drivers as reference value. For example, here the actual value is the retailer price displayed in the store for the product at the time of estimation. The resulting quantity estimate from the machine learning model is noted as reference volume due to the sales driver. It is the volume in which the sales driver with actual value influence the mind of customers to increase or decrease the quantity of intended product and other sales drivers with reference values do not have influence to increase or decrease the quantity. Thus, it ensures to consider short term sales driver variations that arise due to supply variations and other causes. The prediction happens in real time using the latest feed comes from spark having the latest information about sales drives of real time.

In the preferred embodiment, the sales volume contribution by sales driver is calculated by subtracting reference base volume from reference volume due to sales driver. The sales volume contribution may be positive or negative depending on the effect of sales driver. It is repeated for each sales driver and respective contribution in terms of quantity is calculated.

Sales volume contribution by a sales driver=Reference volume due to sales driver—Reference base volume (1)

In the preferred embodiment of the disclosure, the contribution determination module (114) of the system (100) is configured to determine sales volume contribution of the predefined sales driver in actual form or in component form for the product from the difference between reference volume of the sales driver and reference base volume.

Usually demographic variables are available at individual store level. Each demographic variable capture information about the store and they singly or in a group have network relationship with other variable or variable group. The demographic component has condensed information about associated demographic variables in a network format. For demographic variables, the sales volume contribution is estimated at demographic component level. However, business users are more interested to know at individual variable level. The contribution of individual variable depends on 1) sales volume contribution by demographic component, 2) The variables associated with the demographic component and its relationship with the demographic component. The amount of network relationship is measured from factor loadings and they are derived by using open source programing language. In an instance the system is used to derive factor loadings. The sales volume contribution of each variable varies depending on their factor loading and corresponding demographic component contribution.

$$\text{Sales volume contribution by individual variable} = \text{Factor loading of individual variable} * \text{Sales volume due to demographic component} \quad (2)$$

In the preferred embodiment of the disclosure, the contribution deriving module (114) of the system (100) is configured to derive sales volume contribution of the predefined individual variable of a sales driver in component form for the product based on the estimated sales volume contribution due to the sales driver component and network relationship existing among the variables within the component.

In the preferred embodiment of the disclosure, the recommendation module (114) of the system (100) is configured to recommend one or more retail strategies in real time using sales volume contribution of the predefined sales driver for the product. The sales volume contribution by a sales driver may be positive or negative depending on the effect of sales driver. If it is positive it indicates that the sales driver is contributing to total volume of the product and if it is negative the sales driver is reducing the total volume of the product for the particular period. The contribution outcomes are displayed in tabular format and graphical representation. In graphical representation, positive sales drivers are marked as green and negative sales driver as red and the color intensity is in proportion to their contribution. The coloring and its intensity recommend category managers to take suitable strategies.

Figure 4:
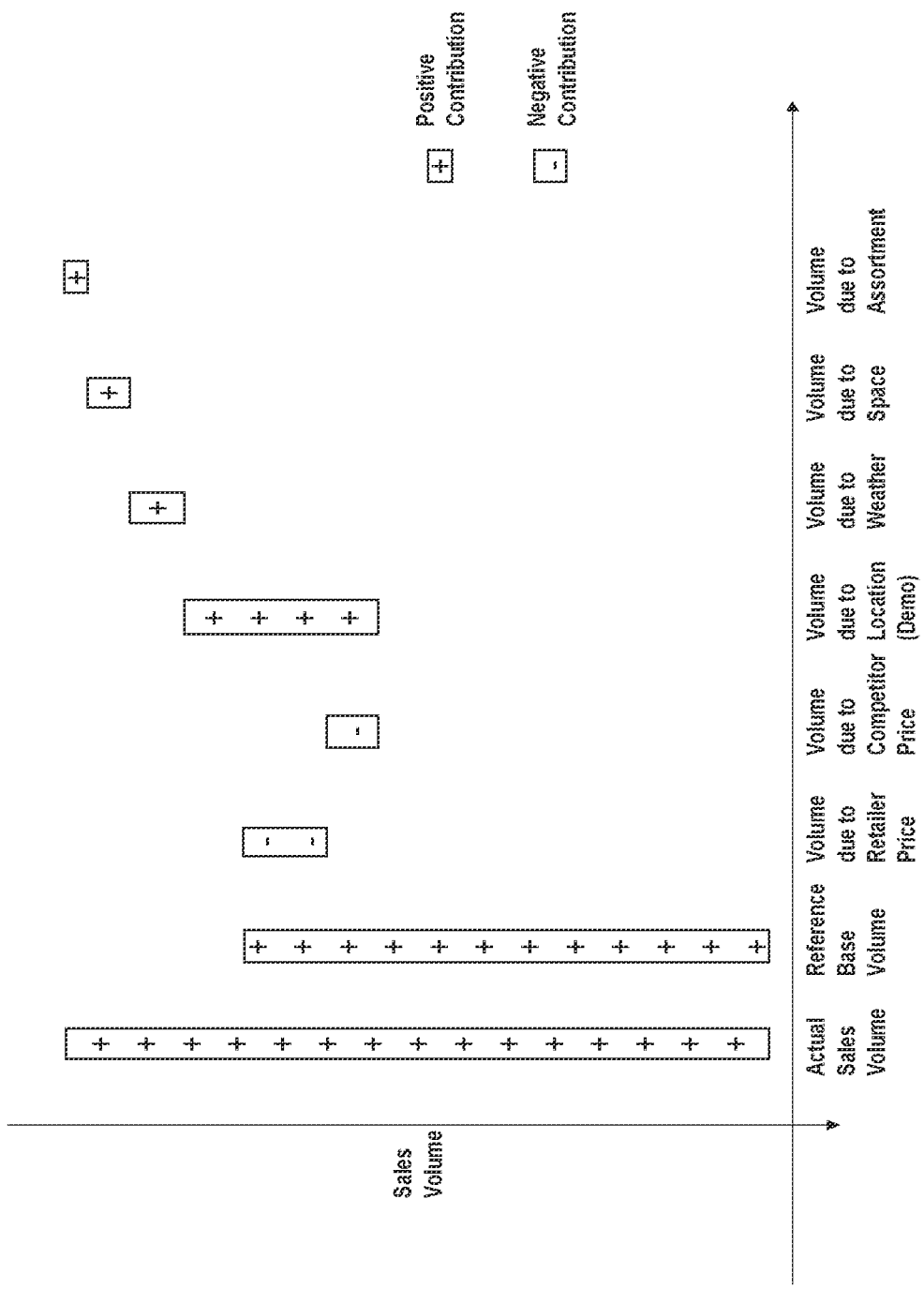
FIG. 4 is a graphical representation for sales volume decomposition of a product with high fluctuations in sales drivers, in accordance with some embodiments of the present disclosure.

Referring FIG. 4, as an example, illustrating graphical representation for sales volume decomposition of a product with high fluctuations in sales drivers. Wherein, it provides the quantity reduction that arise due to competitor price. This helps the retailer to price the product competitively. Similarly, it indicates that the increase in last three hours sales is due to weather and retailer can make adjustments in assortment based on forecasted weather for next few hours. As demographic component comes as positive it indicates that localized assortment followed in the store has caused sales volume increase. Similarly, it indicates the strategies for space allocation for the product category and number of substitutes for the product to be kept in assortment.

Figure 5:
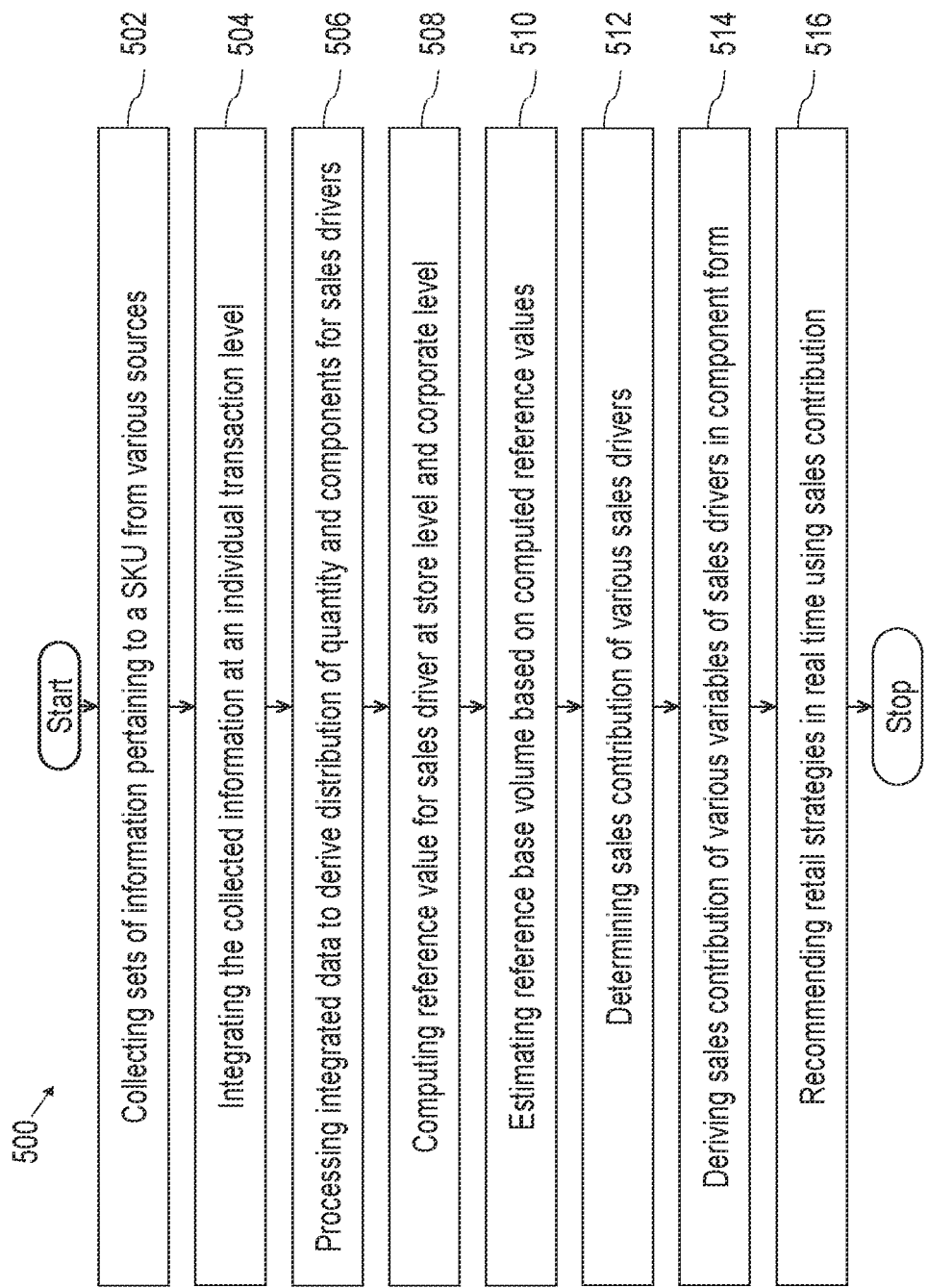
FIG. 5 is a flow diagram to illustrate a method for sales volume decomposition of a product with high fluctuations in sales drivers, in accordance with some embodiments of the present disclosure.

Referring FIG. 5, a processor-implemented method (500) sales volume decomposition of a product with high fluctuations in sales drivers. The method comprises one or more steps as follows.

Initially, at the step (502), a first set of transaction level historical sales volume information of a product, customer information, and one or more predefined sale drivers of the product are collected from one or more predefined sources.

In the preferred embodiment of the disclosure, at the next step (504), integrating the collected first set of transaction level historical sales volume information of the product, customer information, and one or more predefined sale drivers.

In the preferred embodiment of the disclosure, at the next step (506), processing the integrated historical information to generate one or more metrices of the integrated information and sales driver components. Wherein, one or more metrices include probability distributional parameters of quantity at store customer level and at corporate level.

In the preferred embodiment of the disclosure, at the next step (508), computing a reference value for one or more predefined sales driver in actual form and in derived component form of the product at store level and corporate level based on the one or more metrices of the integrated information.

In the preferred embodiment of the disclosure, at the next step (510), estimating reference base volume of the product based on the computed reference values of the predefined sales drivers using a trained machine learning model.

In the preferred embodiment of the disclosure, at the next step (512), determining sales volume contribution of the predefined sales driver in actual form or component form for the product from the difference between reference volume of the sales driver and reference base volume.

In the preferred embodiment of the disclosure, at the next step (514), deriving sales volume contribution of the predefined individual variable of a sales driver in component form for the product based on the estimated sales volume contribution due to the sales driver component and network relationship existing among the variables within the component.

In the preferred embodiment of the disclosure, at the last step (516), recommending one or more retail strategies in real time using sales volume contribution of the predefined sales driver for the product.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of sales volume decomposition such as base volume and volumes associated with other sales drivers such as price, promotion etc. Existing methods considers price variations which leads to base volume estimation with price effect and demography of the customer store. The system and method compute herein a reference value for various sales drivers in actual form and in derived component form of the product at store level and corporate level and estimates reference base volume using a trained machine learning model. The sales volume contribution of individual variable of a sales driver is derived based on the estimated sales volume contribution due to sales driver component and network relationship existing among the variables within the components. Retail strategies are recommended in real time based on sales volume contribution of the sales driver for the product.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device, which can be programmed including e.g.

any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development would change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It roust also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:
collecting, via one or more hardware processors, a set of transaction level historical sales volume information of a product, customer information associated with the product, and one or more predefined sales drivers of the product, wherein
the one or more predefined sales drivers are collected from one or more predefined sources,
the one or more predefined sales drivers include demography information of each store,
the demography information is information relates to a population of a trade area of each store, and
each store has a plurality of component scores that represents demographic variables in a condensed format;
integrating, via the one or more hardware processors, the collected set of transaction level historical sales volume information of the product, the collected customer information, and the collected one or more predefined sales drivers;
applying a software framework for distributed storage to store and process the integrated set of transaction level historical sales volume information, wherein
the integration and data processing occurs in a Random Access Memory (RAM) so that the data processing and the integration of different level of transaction in real time, and
the different level of transaction includes a store customer level and a corporate level;
training a machine learning model using the integrated set of transaction level historical sales volume information;
processing, via the one or more hardware processors, using the trained machine learning model, the integrated set of transaction level historical sales volume information;
generating, based on the processing, via the one or more hardware processors, one or more metrices and one or more sales driver components associated with the product, wherein the generated one or more metrices include probability distributional parameters of quantity at the store customer level and at the corporate level;
converting the demography information into a correlation matrix;
applying a principal component analysis to the converted correlation matrix, to condense specific information of the converted correlation matrix without losing a network relationship between a plurality of components of the specific information;
deriving the plurality of components from the specific information, wherein the plurality of components is derived in a network fashion;
computing, via the one or more hardware processors, a reference value for the collected one or more predefined sales drivers in an actual form of the product or in a derived component form of the product at the store customer level and the corporate level, wherein the computation of reference value is based on the one or more metrices and the derived plurality of components;
estimating, via the one or more hardware processors, a reference base volume of the product based on the computed reference value, using the trained machine learning model, wherein the estimation further comprises:

mapping historical sales volume data with the one or more pre-defined sales drivers, wherein the one or more sales drives includes a price of the product, a competitor price of the product, demographic components, weather, a space occupied by a category to which the product belongs, a number of available substitute products in assortment at the time of sale; and determining:
  a quantity of sales volume at a specific time interval as dependent variables; and
  the one or more pre-defined sales drivers at the specific time interval as independent variables, wherein the specific time interval is based on a velocity of the product at which the product is sold;

training, via the one or more hardware processors, using the determined dependent variables and the determined independent variables, a specific machine learning model, wherein the specific machine learning model is a random forest at the corporate level;

capturing, via the one or more hardware processors, based on the trained specific machine learning model, sales volume variations that arise across stores due to retailer price, the competitor price, location, weather of the store, a space occupied by the product, and assortment, wherein the specific machine learning model is trained for a specific period of time, wherein the specific period of time is between seven days to thirty days;

determining, via the one or more hardware processors, sales volume contribution of the collected one or more predefined sales drivers in the actual form of the product or in the component derived form of the product based on a difference between a reference volume of a sales driver and a reference base volume;

deriving, via the one or more hardware processors, sales volume contribution of a predefined individual variable of the sales driver in the derived component form for the product, wherein the sales volume contribution by the predefined individual variable of the one or more pre-defined variables is derived based on a product of:
  a factor loading of the predefined individual variable, and
  sales volume due to demographic component; and recommending, via the one or more hardware processors, one or more retail strategies in real time using the derived sales volume contribution of the predefined sales drivers for the product, wherein
  the sales volume contribution by the predefined individual variable is one of a positive contribution or a negative contribution depending on an effect of predefined individual variable,
  the positive contribution indicates that the predefined individual variable is contributing to a total volume of the product for a particular period, and
  the negative contribution indicates that the predefined individual variable is reducing the total volume of the product for the particular period;

displaying, via the one or more hardware processors, one of the positive contribution or the negative contribution in a tabular format and a graphical representation, wherein the positive contribution is indicated in a green color and the negative contribution is indicates in a red color in the graphical representation.

2. The processor-implemented method of claim 1, wherein the one or more sales driver components are derived using a variable reduction technique and the network relationship.

3. The processor-implemented method of claim 1, wherein the reference volume of the sales driver in the actual form or in the derived component form is estimated by applying an actual value of the sales driver and a reference value of specific sales drivers in the trained machine learning model.

4. The system, comprising:
  an input/output interface configured to collect a set of transaction level historical sales volume information of a product, customer information associated with the product, and one or more predefined sale drivers of the product, wherein
    the one or more predefined sales drivers are collected from one or more predefined sources,
    the one or more predefined sales drivers include demography information of each store, and
    the demography information is information relates to a population of a trade area of each store, and
    each store is assigned a plurality of component scores that represents demographic variables in a condensed format;
  one or more hardware processors; and
  a memory in communication with the one or more hardware processors, wherein the one or more hardware processors are configured to execute programmed instructions stored in the memory, to:
    integrate the collected set of transaction level historical sales volume information of the product, the collected customer information, and the collected one or more predefined sale drivers;
    apply a software framework for distributed storage to store and process the integrated set of transaction level historical sales volume information, wherein
      the integration and data processing occurs in a Random Access Memory (RAM) of the memory so that the data processing and the integration of different level of transaction completed in real time, and
      the different level of transaction includes a store customer level and a corporate level;
    train a machine learning model using the integrated set of transaction level historical sales volume information;
    process, using the trained machine learning models, the integrated set of transaction level historical sales volume informations;
    generate, based on the processing, one or more metrices and one or more sales driver components associated with the product, wherein the generated one or more metrices include probability distributional parameters of quantity at the store customer level and at the corporate level;
    convert the demography information into a correlation matrix;
    apply a principal component analysis to the converted correlation matrix, to condense specific information of the converted correlation matrix without losing a network relationship between a plurality of components of the specific information;
    derive the plurality of components from the specific information, wherein the plurality of components is derived in a network fashion;

compute a reference value for the collected one or more predefined sales driver in an actual form of the product or in a component form of the product at the store customer level and the corporate level, wherein the computation of the reference value is based on the one or more metrices;

estimate reference base volume of the product based on the computed reference value, using the trained machine learning model, wherein the estimation further comprises:
mapping historical sales volume data with the one or more pre-defined sales drivers, wherein the one or more sales drives includes a price of the product, a competitor price of the product, demographic components, weather, a space occupied by a category to which the product belongs, a number of available substitute products in assortment at the time of sale; and
determining:
a quantity of sales volume at a specific time interval as dependent variables; and
the one or more pre-defined sales drivers at the specific time interval as independent variables, wherein the specific time interval is based on a velocity of the product at which the product is sold;
training, using both the determined dependent variables and the determined independent variables, a specific machine learning model, wherein the specific machine learning model is a random forest at the corporate level;

capture, based on the trained specific machine learning model, sales volume variations that arise across stores due to retailer price, the competitor price, a location, the weather, a space, and assortment, wherein
the specific machine learning model is trained for a specific period of time, and
the specific period of time is between seven days to thirty days;

determine sales volume contribution of the predefined sales driver in the actual form of the product or in the component derived form of the product based on a difference between a reference volume of a sales driver and a reference base volume;

derive sales volume contribution of a predefined individual variable of the sales driver in the derived component form for the product, wherein the sales volume contribution by the predefined individual variable of the one or more pre-defined variables is derived based on a product of:
a factor loading of the predefined individual variable, and
sales volume due to demographic component; and recommend one or more retail strategies in real time using the derived sales volume contribution of the predefined sales driver for the product, wherein
the sales volume contribution by the predefined individual variable is one of a positive contribution or a negative contribution depending on an effect of predefined individual variable,
the positive contribution indicates that the predefined individual variable is contributing to a total volume of the product for a particular period, and
the negative contribution indicates that the predefined individual variable is reducing the total volume of the product for the particular period;

displaying, via the one or more hardware processors, one of the positive contribution or the negative contribution in a tabular format and a graphical representation, wherein the positive contribution is indicated in a green color and the negative contribution is indicates in a red color in the graphical representation.

5. A non-transitory computer readable medium storing one or more instructions which when executed by one or more processors on a system, cause the one or more processors to perform method comprising:
collecting, via one or more hardware processors, a set of transaction level historical sales volume information of a product, customer information associated with the product, and one or more predefined sales drivers of the product, wherein
the one or more predefined sales drivers are collected from one or more predefined sources,
the one or more predefined sales drivers include demography information of each store,
the demography information is information relates to a population of a trade area of each store, and
each store has a plurality of component scores that represents demographic variables in a condensed format;
integrating, via the one or more hardware processors, the collected set of transaction level historical sales volume information of the product, the collected customer information, and the collected one or more predefined sales drivers;
applying a software framework for distributed storage to store and process the integrated set of transaction level historical sales volume information, wherein
the integration and data processing occurs in a Random Access Memory (RAM) so that the data processing and the integration of different level of transaction in real time, and
the different level of transaction includes a store customer level and a corporate level;
training a machine learning model using the integrated set of transaction level historical sales volume information;
processing, via the one or more hardware processors, using the trained machine learning model, the integrated set of transaction level historical sales volume information;
generating, based on the processing, via the one or more hardware processors, one or more metrices and one or more sales driver components associated with the product, wherein the generated one or more metrices include probability distributional parameters of quantity at the store customer level and at the corporate level;
converting the demography information into a correlation matrix;
applying a principal component analysis to the converted correlation matrix, to condense specific information of the converted correlation matrix without losing a network relationship between a plurality of components of the specific information;
deriving the plurality of components from the specific information, wherein the plurality of components is derived in a network fashion;
computing, via the one or more hardware processors, a reference value for the collected one or more predefined sales drivers in an actual form or in a derived component form of the product at the store level and the corporate level, wherein the computation of reference value is based on the one or more metrics and the derived plurality of components;

estimating, via the one or more hardware processors, a reference base volume of the product based on the computed reference value, using the trained machine learning model, wherein the estimation further comprises:

mapping historical sales volume data with the one or more pre-defined sales drivers, wherein the one or more sales drives includes a price of the product, a competitor price of the product, demographic components, weather, a space occupied by a category to which the product belongs, a number of available substitute products in assortment at the time of sale; and determining:

a quantity of sales volume at a specific time interval as dependent variables; and the one or more pre-defined sales drivers at the specific time interval as independent variables, wherein the specific time interval is based on a velocity of the product at which the product is sold;

training, via the one or more hardware processors, using the determined dependent variables and the determined independent variables, a specific machine learning model, wherein the specific machine learning model is a random forest at the corporate level;

capturing, via the one or more hardware processors, based on the trained specific machine learning model, sales volume variations that arise across stores due to retailer price, the competitor price, location, weather of the store, a space occupied by the product, and assortment, wherein the specific machine learning model is trained for a specific period of time, wherein the specific period of time is between seven days to thirty days;

determining, via the one or more hardware processors, sales volume contribution of the collected one or more predefined sales drivers in the actual form of the product or in the component derived form of the product based on a difference between a reference volume of a sales driver and a reference base volume;

deriving, via the one or more hardware processors, sales volume contribution of a predefined individual variable of the sales driver in the derived component form for the product, wherein the sales volume contribution by the predefined individual variable of the one or more pre-defined variables is derived based on a product of:

a factor loading of the predefined individual variable, and sales volume due to demographic component; and recommending, via the one or more hardware processors, one or more retail strategies in real time using the derived sales volume contribution of the predefined sales drivers for the product, wherein the sales volume contribution by the predefined individual variable is one of a positive contribution or a negative contribution depending on an effect of predefined individual variable, the positive contribution indicates that the predefined individual variable is contributing to a total volume of the product for a particular period, and the negative contribution indicates that the predefined individual variable is reducing the total volume of the product for the particular period;

displaying, via the one or more hardware processors, one of the positive contribution or the negative contribution in a tabular format and a graphical representation, wherein the positive contribution is indicated in a green color and the negative contribution is indicates in a red color in the graphical representation.

\* \* \* \* \*